United States Patent
Glaser

(10) Patent No.: US 10,127,486 B2
(45) Date of Patent: Nov. 13, 2018

(54) MULTI-FREQUENCY AND SINGLE SIDE BAND RFID METHODS OF COMMUNICATION

(71) Applicant: Lawrence F Glaser, Fairfax Station, VA (US)

(72) Inventor: Lawrence F Glaser, Fairfax Station, VA (US)

(*) Notice: Subject to any disclaimer, the term of this patent is extended or adjusted under 35 U.S.C. 154(b) by 0 days.

(21) Appl. No.: 14/996,290

(22) Filed: Jan. 15, 2016

(65) Prior Publication Data

US 2016/0210483 A1    Jul. 21, 2016

Related U.S. Application Data

(60) Provisional application No. 62/104,720, filed on Jan. 17, 2015.

(51) Int. Cl.
| | | |
|---|---|---|
| *H04Q 5/22* | (2006.01) | |
| *G06K 19/07* | (2006.01) | |
| *G06K 7/10* | (2006.01) | |

(52) U.S. Cl.
CPC ..... *G06K 19/0724* (2013.01); *G06K 7/10069* (2013.01)

(58) Field of Classification Search
CPC ................. G06K 19/0724; G06K 7/10069
USPC ............... 340/10.1–10.6, 572.1–572.9
See application file for complete search history.

(56) References Cited

U.S. PATENT DOCUMENTS

| | | | | |
|---|---|---|---|---|
| 2004/0169587 A1* | 9/2004 | Washington | ....... | G06K 7/10079 340/573.1 |
| 2004/0176050 A1* | 9/2004 | Steer | ..... | H01Q 3/2611 455/101 |
| 2005/0064855 A1* | 3/2005 | Russell | ..... | H04M 3/54 455/417 |
| 2005/0122211 A1* | 6/2005 | Yoshigi | ..... | G06K 19/0726 340/10.1 |
| 2006/0158328 A1* | 7/2006 | Culpepper | ..... | G08B 21/0269 340/539.13 |
| 2007/0052524 A1* | 3/2007 | Tanaka | ..... | G06K 7/0008 340/10.2 |
| 2007/0279277 A1* | 12/2007 | Kuramoto | ..... | H01Q 3/04 342/147 |
| 2008/0002627 A1* | 1/2008 | Cha | ..... | H01Q 3/2611 370/334 |
| 2008/0252459 A1* | 10/2008 | Butler | ..... | G06K 7/0008 340/572.1 |
| 2008/0266098 A1* | 10/2008 | Aiouaz | ..... | H04W 52/16 340/572.1 |
| 2008/0279287 A1* | 11/2008 | Asahina | ..... | H04B 1/69 375/242 |
| 2009/0146892 A1* | 6/2009 | Shimizu | ..... | G06K 19/0726 343/745 |

(Continued)

*Primary Examiner* — Kerri McNally
*Assistant Examiner* — Thang Tran
(74) *Attorney, Agent, or Firm* — Leslie R. J. Virany

(57) ABSTRACT

MFQRFID, (Multi-Frequency RFID, for purposes of this document) utilizes legacy RFID circuitry adding at least a second transmitter (xmit) and receiver (rec) tuned to a second frequency, through a second antenna array allowing a single core modem, power management and processing/memory to share the at least two xmit/rec channels. Thereafter, the two channels, being on different frequencies, may be independently selected by the RFID circuitry based on signal strength of the communicating external device.

20 Claims, 5 Drawing Sheets

(56) References Cited

U.S. PATENT DOCUMENTS

| | | | | |
|---|---|---|---|---|
| 2009/0167499 A1* | 7/2009 | Koo | G06K 7/0008 | 340/10.1 |
| 2010/0039228 A1* | 2/2010 | Sadr | G01S 5/12 | 340/10.1 |
| 2010/0079252 A1* | 4/2010 | Tsujimoto | G06K 7/0008 | 340/10.1 |
| 2010/0093279 A1* | 4/2010 | Linsky | H03L 7/183 | 455/41.2 |
| 2010/0109933 A1* | 5/2010 | Rhodes | H04B 13/02 | 342/22 |
| 2011/0149798 A1* | 6/2011 | Cordeiro | H04W 8/005 | 370/254 |
| 2011/0300853 A1* | 12/2011 | Darabi | H04W 88/06 | 455/422.1 |
| 2012/0319821 A1* | 12/2012 | Karttaavi | G06K 7/0008 | 340/10.1 |
| 2012/0329407 A1* | 12/2012 | Rousu | H01Q 3/2605 | 455/90.2 |
| 2013/0138246 A1* | 5/2013 | Gutmann | G05D 1/0231 | 700/253 |
| 2013/0201003 A1* | 8/2013 | Sabesan | G01S 7/42 | 340/10.1 |
| 2014/0074667 A1* | 3/2014 | Smith | G01S 5/12 | 705/28 |
| 2014/0183269 A1* | 7/2014 | Glaser | G06F 21/32 | 235/492 |
| 2015/0036416 A1* | 2/2015 | Kim | G11C 5/14 | 365/149 |
| 2015/0177330 A1* | 6/2015 | Morris | G01R 31/3627 | 320/106 |

* cited by examiner

Passive MFQRFID (Prior Art)
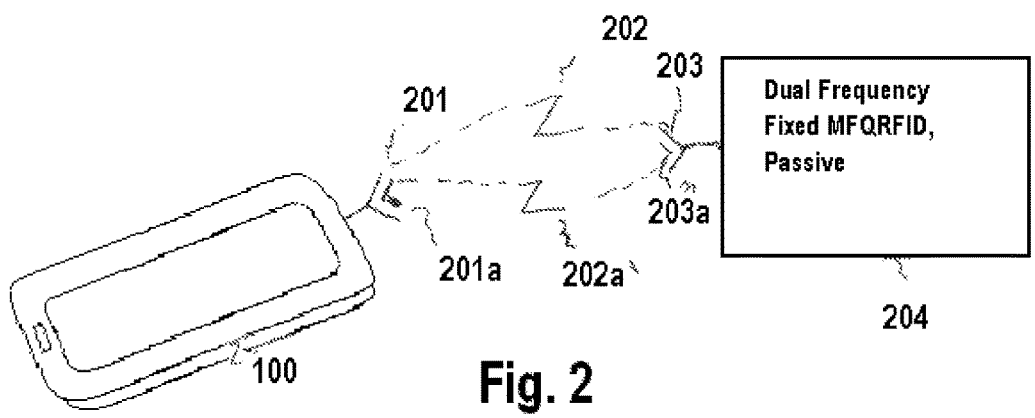
Fig. 2
Fig. 3
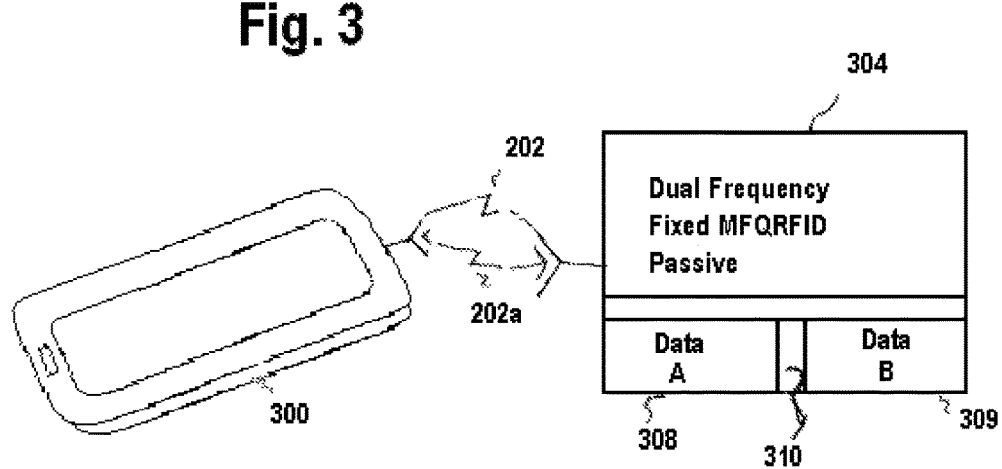
| Device | Pathway | MFQRFID | Data |
|---|---|---|---|
| 300 | 202 | 304 | 308 |
| 300 | 202a | 304 | 309 |
| 300 | 202 | 304 | 310 |
| 300 | 202a | 304 | 310 |

MULTI-FREQUENCY AND SINGLE SIDE BAND RFID METHODS OF COMMUNICATION

BACKGROUND

RFID-polling devices exist for inventory and shopping related purposes. For example U.S. Pat. No. 8,305,192 RFID reader with automatic near/far field interrogation mode switching, and related operating methods U.S. Pat. No. 7,336,177 RFID system and method for tracking individual articles. U.S. Pat. No. 7,253,717 Armstrong Method and system for communicating with and tracking RFID transponders.

However they lack apparatus and methods for Homing, and homing through thousands of competing RFID fields of communications.

SUMMARY

The present invention solves these and other problems of the prior art by more fully exploiting the highly and inexpensively useful electrodynamic properties of convenient antennas easily available for mobile products. Such properties include, as a non-limiting example, frequency-dependent attenuation, side band communications and extremely precise and predictable propagation directions.

MFQRFID, (Multi-Frequency RFID, for purposes of this document) utilizes legacy RFID circuitry adding at least a second transmitter (xmit) and receiver (rec) tuned to a second frequency, through a second antenna array allowing a single core modem, power management and processing/memory to share the at least two xmit/rec channels. Thereafter, the two channels, being on different frequencies, may be independently selected by the RFID circuitry based on signal strength of the communicating external device. Alternatively, all channels are used simultaneously.

Through creative spacing of the frequencies in use, an external device seeking to communicate with the RFID circuitry (through the RFID modem) allows the remote device to establish communications on one frequency and channel first, thereafter providing some guidance (homing) to the RFID circuitry due to attenuation field strength and the remote device being optimized to provide a vector, a direction to the RFID circuitry. The accuracy of the vector plays in much less in this scenario because of the following phenomena. As the remote device seeking further communications and direction to the RFID circuitry moves closer, a second frequency comes into range providing a new vector in similar fashion and communications. Because the frequencies will be higher and higher as the device seeking communications and direction moves closer and closer, other RFIDs in proximity play in less and less based on the simple phenomena of attenuation diminishment over distance which may be further based on frequency (a barring effect is thus cited and referenced with the term "barring effect"). Higher frequencies require shorter transmission antenna and as such, if the amplifier is maintained as linear, the field density will diminish as the frequency selected is higher. To further enhance the effect, we need only set the xmit power level to a lower level for each successive higher frequency and we achieve the net sum desired effect. The external device seeking communications with the MFQRFID finds the lowest frequency generates the strongest field, while each successive higher frequency from the same RFID "core" generates weaker and weaker fields at set values which are controlled by the manufacturing process and any selective permanent load we wish to add to the transmission line, or software controls or both hardware and software limiters. in embodiments, this scheme is used if the field strengths are the same or even reversed. The select frequencies can take into account the anticipated environment to enhance the effect of the invention. Homing, and homing through thousands of competing RFID fields of communications is one feature of this invention. Selective communications with only one RFID, ignoring other RFID beacons is another feature. Moving up the frequencies assures the field strength from competing RFID marked items diminishes as to move closer and closer to the one RFID marked item we wish to maintain communications with. RFIDs emit unique identifiers which explains how the device knows it is homing to a fixed position.

Loading the push amplifier, the transmitting amp that sends RF out of the chip so the higher the frequency the lower the strength, preset of course, provides the effect desired for the present invention. in an alternative embodiment, this technique is used in reverse, where the higher the frequency the higher the strength and the lower the frequency, the lower the strength.

As the user walks through a warehouse with 100 billion items, the wifi routers can provide general direction to the area where items of the class being sought are generally stored. Then, the user's device will "see" and communicate with perhaps 1000 of the billion items in this warehouse because the RFID channels are limited through the methods of the present invention. As a result, the user can ask the 1000 widgets, which, for example, is the blue one? The user is homed to a blue one. A lookup table of RFID unique identifiers versus description of the item tagged with the RFID comes into play, across the WiFi or even a carrier channel. The desired item is literally singled out because the frequency ultimately homed to is only good for 3 feet, then yet another only good to 2 feet and so on, Through a process of layering and revectoring. The device of the present invention can even ask the other RFIDs synced to me to stop communicating if literally, the user has singled out the one he wants to find or the user can rule out RFID tagged items and electronically ask their RFIDs to go silent.

Using several frequencies the present invention can thus home in a user to literally touch the item tagged with the rfid tag of this invention. The device seeking communications with the RFID tag can be a proprietary device, or, alternatively, an appropriately equipped cellular telephone or tablet, a peripheral apparatus to a cell phone/laptop/tablet, laptop or wrist watch, wearable electronics or just another RFID chip with the prerequisite communications capability to the user. (eg with a display and software, processing to guide the user).

Single Side Band (SSB) technology is proposed, in an embodiment to share the transmission line of a given RFID. In an embodiment, MFQRFID and SSBRFID are used simultaneously, in a single RFID chip. In this embodiment, the present invention has two or more transmission lines and within each line, as many higher or lower side band channels as is necessary for a given application. Here again, attenuation of transmitted signal is dependent upon any loading scheme we wish to apply, causing the homing effect and the barring effect of communications to other RFIDs in proximity to apply.

In accordance with this aspect of the present invention, the homing effect literally guides a user through countless millions of other RFIDs to reach the one RFID they are seeking, presuming only that the physical access pathway is clear or able to be traversed by the user.

An object of the invention is auto tracking of a given set of objects, because they changed from static to mobile, or even in another person's cart, to your cart. If they move in sync with you (with one or more of your devices), they automatically form a list. The user can see and modify the list. The user can also scan items assuring the list polled automatically matches precisely, that which is in their physical cart.

A further object of the invention is auto polling, I can poll and take inventory better if I can selectively talk to RFID groups within RFID groups. So, by logically arranging the tag frequencies, I can talk to different classes of inventory and get a head count. (auto inventory) A further object of the invention is far superior homing, allowing someone with a hand held cell, for example, to walk right up to a needle in a haystack with no wasted time. eg works as fast as we can walk around, solving for homing down to a unique item. A further object of the invention is auto mapping with more accurate depiction of where my inventory is sitting and in three dimensions, X, Y and Z. (Z being above at or below sea level)

A further object of the invention is cost reduction: as 3-D printers become more capable, the cost to do this per tag approaches less than a cent. As such, tagging everything, every least common denominator will become popular. Even parts in a machine. (so disassembly, assembly and trouble shooting is enhanced)

A further object of the invention is the far more accurate depiction of a user's location, with an appropriately equipped device within a RFID field.

A further object of the invention is the far more accurate depiction of a device' identity within an RFID field. A further object of the invention is the far more accurate permanent placement of permanent electronic devices such as wifi routers, cctv cameras, other forms of router or data communications device intended to be static, mapped as to its location in three dimensions, X, Y and Z, and further, correlated to a known grid such as the GPS grid. (Global Positioning System/s)

A further object of the invention is the accurately placed static electronic device is enabled to generate a mapping of objects in its field, RFID objects, which can be mapped and tracked with extreme accuracy due to the specific attributes of this invention A further object of the invention is the devices in the field of local static electronic devices, such as wifi routers, can be allowed to communicate or barred from communicating due to information and instructions passed to the device in the field, through RFID channels. We can thus bar communications in specific blocks of 3-D mapped space with given X, Y and Z coordinates for each point in the barred field. In embodiments, the field is a cube, rectangle or a more complex contiguous shape.

A further object of the invention is to add encryption and virus detection to the static devices to assure safer communications within the field.

A further object of the invention is to provide instructions to devices in the field to limit communications between devices to assure as traffic increases and more devices are in the field, intercommunication between devices is intelligently throttled to avoid latency.

A further object of the invention is to allow a device communicating with a plurality of RFIDs to send and receive commands allowing a selective ignore hereinafter "feature" and turn off RFID communications for a set time. Selected RFIDs in range stop responding to facilitate homing to a class of RFIDs in the field, or a single RFID in the field of communications based on these interchanged commands. The device can thus use any search and sort criteria to open or close RFIDs in range to further communication and homing functions.

A further object of the invention is to allow the first communications connection to thereafter, optionally, bar any further communications from the discrete RFID core until the communication session is released by the remote device, or it may be over-ridden by the RFID circuitry, such as when power fails and the RFID chip has to reboot from a new power source.

A further object of the invention is to allow the first communications connection, with proper security code and encrypted access, to thereafter reprogram the RFID chip in any manner the chip is capable of supporting. This may include allowing one or more simultaneous connections, liming functions, features or other communications thereafter, for any one connection or multiple connections.

DESCRIPTION OF THE DRAWINGS

FIG. 2 Passive MFQ Rfid (Multi-Frequency Radio Frequency Identification [Device]) connectivity between an Rfid "chip" and Rfid capable Cell Phone is depicted.

FIG. 3 Passive MFQ Rfid (Multi-Frequency Radio Frequency Identification [Device]) connectivity between an Rfid "chip" and Rfid capable Cell Phone is depicted wherein, for each frequency channel, differing data is allowed or denied automatic passage and the MFQ Rfid Device acts as a router as well as a frequency dependent switch with hard impenetrable firewall present between all functions.

DETAILED DESCRIPTION

Figure 1:
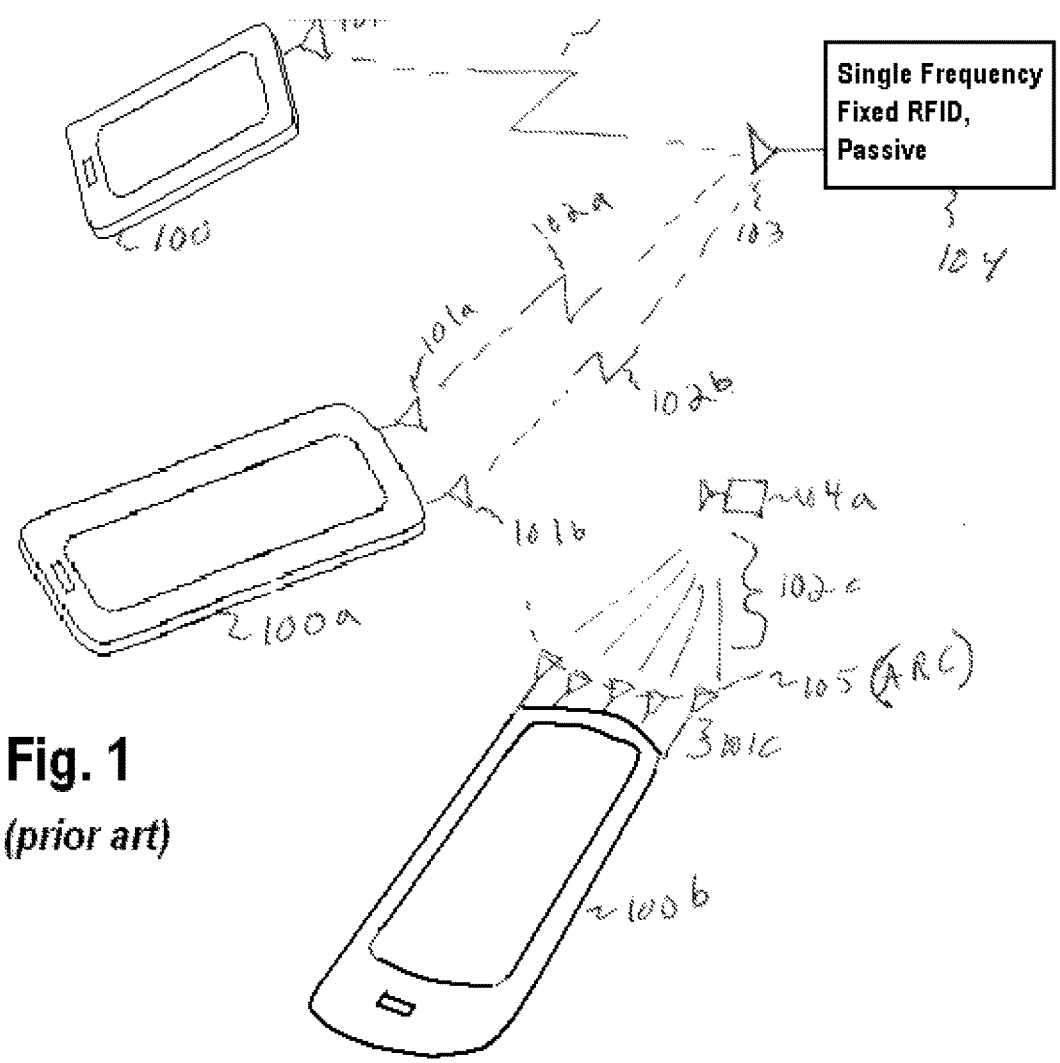
FIG. 1 Passive Rfid (Radio Frequency Identification [Device]) connectivity between an Rfid "chip" and Rfid capable Cell Phone is depicted. Directional Antenna Arrays on the Cell Phones are also shown.

Referring now to FIG. 1, Passive Rfid (Radio Frequency Identification [Device]) connectivity between an Rfid "chip" 104 and Rfid capable Cell Phone 100 is depicted. This is single channel Rfid so the pathways 102, 102a, 102b and 102 c (5 pathways shown for 102c) represent only one frequency-connection to the Rfid Device (104) to Cell Phones 100, 100a and 100b. Cell Phone 100a is equipped with dual antenna 101a and 101b, allowing for two different vector connections to the target Rfid Device through which the use of Parallax (comparative analysis of signal strength received on each antenna) will improve the net sum vector data provided to the cell phone such that applications operated upon the cell phone will benefit from more accurate targeting for such sub applications as providing a user with a more accurate map to the target. Cell Phone 100b furthers the concept of parallax, knowing that the applications are going to be mostly near field (objects within 1000 feet or less) a 5 antenna array is shown 101c arranged along an arc 105, wherein the sign of the arc determines the sensitivity of the array for pinpointing a target in two dimensions. The cell phone, used as the example for homing to an RFID tag or using RFID tagged objects for such things as ecommerce, is using 2 or more antenna. Through loss calculation and comparative analysis, calculating units, in embodiments of the invention, derive parallax and pinpoint the distance to the RFID tag and approximate trajectory. Then a higher frequency is contacted as the user moves closer and the same process repeats until the cell is proximate the tag.

Referring now to FIG. 2, Passive MFQ Rfid (Multi-Frequency Radio Frequency Identification [Device]) connectivity paths 202 and 202a between an MFQRfid "chip" 204 and an MFQRfid capable Cell Phone 100 are depicted. The antenna 201 and 203, as well as 201a and 203a are tuned to one another according to a select fixed frequency differing for each channel. Pathway 202 is thus for one frequency and 202a for a different frequency. It is known to those of skill in Rfid, generally, the lower frequency channels will connect and handshake at greater distances than the higher frequency channels due to basic fundamental electrical and physical properties of radio waves (free space propagation loss) Providing a threshold attenuation level in the Rfid (Device) to reject connectivity and handshake until signal strength and duration of signal passes preset minimum thresholds is advised and is not depicted in the drawings. This assures the Cell Phone is persistent in its positioning and desire to connect. When there are a large number of near field objects, this becomes paramount so as to limit polling and handshake to the minimum common denominator of close in objects. As the Cell Phone homes in on a given Rfid target, other targets may be auto-rejected. This is determinable by the identification of the target, acquiring and thus knowing its unique identifier and thereafter, rejecting communications from all but the one Rfid target by way of unique identifier, frequencies or other data the object emits embedded in its RF signal.

Referring now to FIG. 3, Passive MFQ Rfid (Multi-Frequency Radio Frequency Identification [Device]) connectivity between an Rfid "chip" 304 and Rfid capable Cell Phone 300 is depicted wherein, for each frequency channel, 202 and 202a, differing data is allowed or denied automatic passage and the MFQ Rfid Device acts as a router as well as a frequency dependent switch with hard impenetrable firewall present between all functions. Data contained in the Rfid chip such as Data A 308, Data B 309 or Unique Identifiers 310 associated only and exclusively with this Rfid, are able to be routed only to the channel preset during the manufacturing process of MFQRfid 304. Table 320 shows for device 300, there are pathways present and based on the design intended, data 308, 309 and 310 will be accessible to the Cell Phone 300 only through specific channels. These data are important to sequester so the Cell Phone, as it comes closer and connects with different frequency channels, can know what other signals it is receiving it may reject. Rejection of all unwanted signals quickens the homing and targeting function for applications dependent upon acquiring this data in real time or near real time, minimizing latency. Automating the polling through all near field MFQRfid devices allows and enables automated or automatic inventory counting. In this setting, the many objects in range, near field, can be counted with great rapidity through automation and the logical and creative use of these functions described herein.

Figure 4:
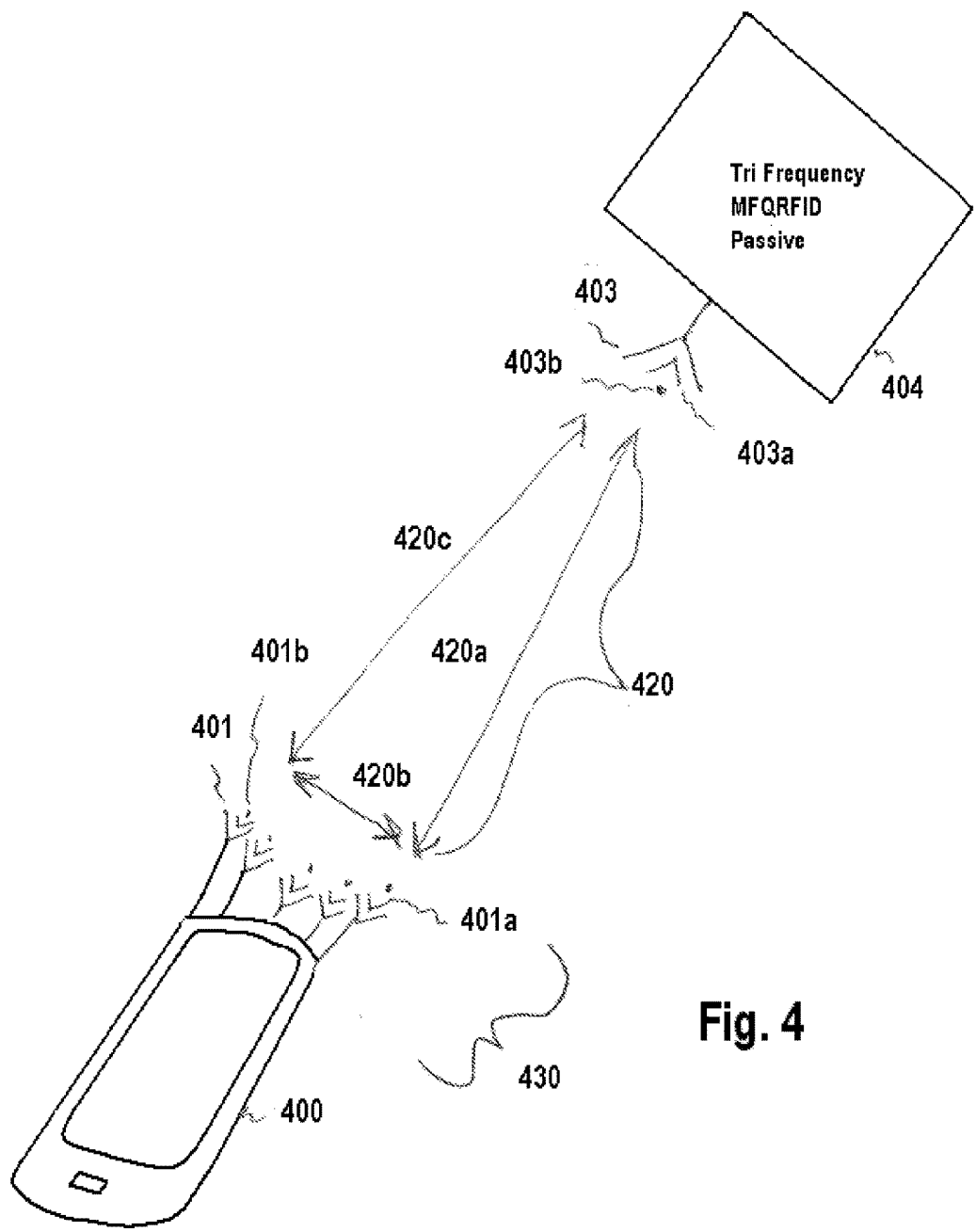
FIG. 4 Passive MFQ Rfid (Multi-Frequency Radio Frequency Identification [Device]) connectivity between an Rfid "chip" and Rfid capable Cell Phone is depicted wherein, for each frequency channel, connectivity is directly dependent upon distance between the Cell Phone and the MFQRfid Device (chip). Also introduced is the idea of a two antenna array on the Cell Phone enabling 2 dimensional Parallax.

FIG. 4 Passive MFQ Rfid (Multi-Frequency Radio Frequency Identification [Device]) connectivity between a MFQRfid "chip" 404 and MFQRfid capable Cell Phone 400 is depicted wherein, for each frequency channel, 401-403, (a first frequency) 401a-403a, (a second frequency) 401b-403b (a third frequency) connectivity is directly dependent upon distance between the Cell Phone 400 and the MFQRfid Device (chip) 404. Distance and frequency determine the order of connectivity. Also introduced is the idea of a five antenna array 430 on the Cell Phone 400 enabling 2 dimensional Parallax 420 using the values known for 420a and 420c which are acquired through attenuation signal strength plotting, and 420b which is fixed. By way of example, said first, second and third frequencies are 1.121, 2.1466 and 6.1992 kHz, respectively.

Figure 5:
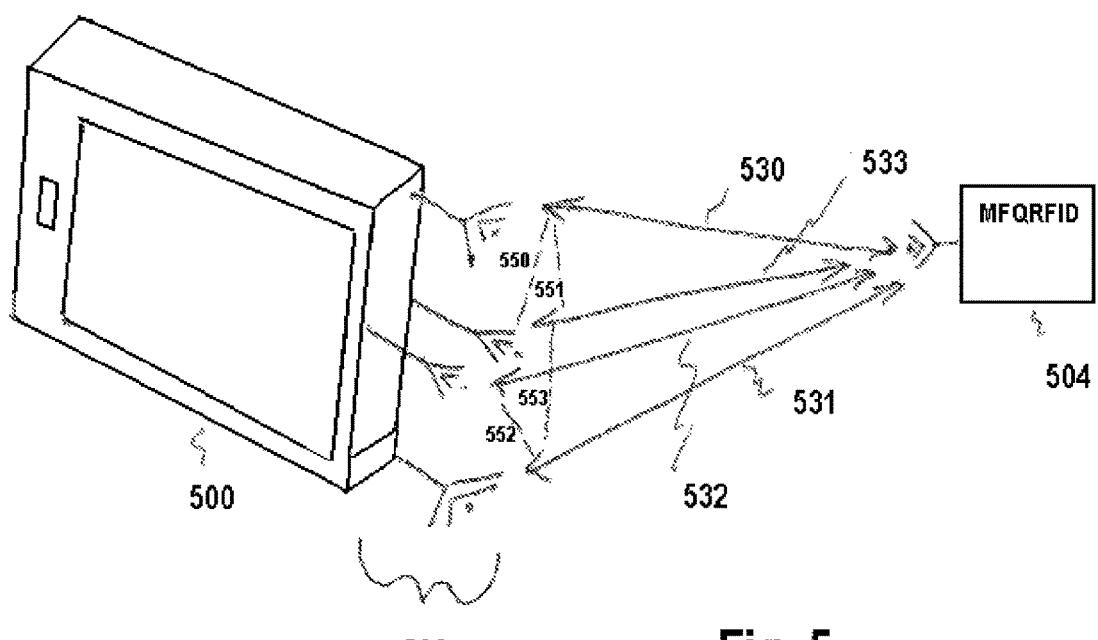
FIG. 5 The idea of a 4 antenna array on the Cell Phone is introduced, wherein the antenna are formed in a dimensional structure so as to establish enough vectors to enable a highly accurate 3-Dimensional mapping of the distance and trajectory to a given MFQRfid target.

FIG. 5 The idea of a 4 antenna array on the Cell Phone 500 is introduced, wherein the antenna array 530 are formed in a 3-Dimensional structure so as to establish enough vectors to enable a highly accurate 3-Dimensional mapping of the distance and trajectory to a given MFQRfid target 504. Fixed Vectors 550, 551, 552 and 553 are used in combination with 530, 531, 532 and 533, which are acquired through attenuation signal strength plotting to perform rapid-real time parallax calculations and make these data available to applications operated within the cell phone. It is noted that the use of channel connectivity to perform nested parallax calculation and, acquisition of data unique per channel connection, represent the novelty and uniqueness and taken as a whole, are not considered prior art to this invention.

In yet another embodiment, on first contact with a communications device with the proper passwords and encryption, the RFID is able to be reprogrammed or pre-programmed to allow or deny additional communications from devices and allow or deny access to any and all features. optionally, the RFID chip itself, though lacking self locator circuitry, holds its location in a memory where the location data is programmed into the RFID from other authorized surrounding communications devices. RFID communication-capable WiFi Routers represent one class of device which can program the RFID with its X, Y and Z coordinates. This will require the RFID to contain a unique identifier so external programming can track one RFID from another.

Figure 6:
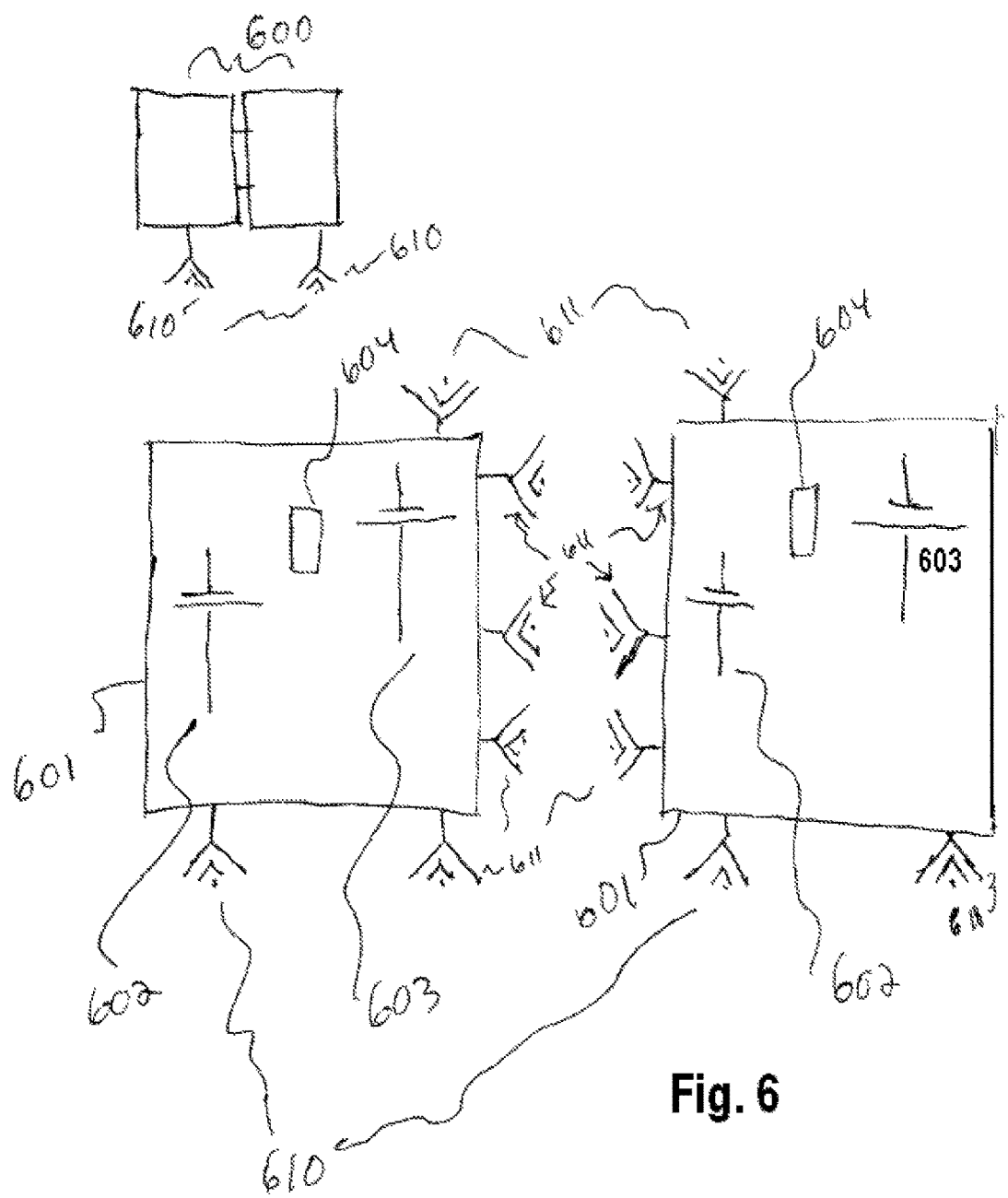
FIG. 6 Shows a redundant RFID chip 600, where the two chips are interconnected by at least two communications pathways.

FIG. 6 Shows a redundant RFID chip 600, where the two chips are interconnected by at least two communications pathways which can also share power, or, additional pathways between the redundant chips which are not shown, may also pass communications and power. The idea is one chip will be master and one slave, wherein, if the master is able to self detect any form of failure, it switches its on state and memory content to the other RFID chip and goes into a "communicate only with redundant chip" mode. Each redundant side has an antenna but only one is used at any given moment for transmission. The dormant antenna can be used for reception, allowing the off line chip to tell the on line chip if in truth, it is transmitting and thus is fully functional. Redundant chips are important because the extra cost to make the redundant version is very, very low, and this affords errors and physical failures to be self detecting, self-correcting and able to be reported to compatible external communications devices.

Also shown is another form of RFID chip (601) with dual capacitors (602,603) for power storage and use for power. Between the capacitors is a voltage regulator circuit (604)

which can programmably share power between the two capacitors within the one RFID chip. One capacitor may be sized smaller than the other, such as 601 being about ⅒th the capacity of 602. Also, the smaller capacitor (601) may charge from one electromagnetic frequency received optimally by antenna (610) while the other capacitor (603) charges from different antenna (611) and with the larger capacitor there may be more than one charging antenna to gather more energy as a function of time, when an electromagnetic field is present. Further, the second capacitor may charge from a different frequency to which the antenna array(s) (611) are tuned. The second frequency can be deliberately selected from ranges least likely to interfere with the primary frequency tuned to antenna 610. Chips 601 as shown, may have interconnections as with the redundant RFID chip (600) which were omitted in the drawing of 601 for clarity.

RFID chip of type 601 is capable of charging other RFID chips in proximity. Because they are able to connect to one another through the RFID communications channels, each chip can inform another to rotate its use of its external antenna to the antenna which is charging the charging RFID chip with the greatest efficiency, As such, each chip carries sufficient circuitry to determine charging rate for its capacitors. Each chip of type 601 with multiple antenna 611, has the ability to switch its outputs to one or more antenna allowing no signal or full signal strength to xmit through each transmission line independently. As such, a plurality of RFID chips each affixed to a different instance of item, can cascade charge one another with the greatest efficiency and without wasting signal strength down a transmission line that is not efficiently charging other RFID chips in proximity.

The functions of redundant chips remain the same. All forms of RFID chip in this specification may be equipped with memory and the memory may retain meta data passed from local devices which indicate interest in an item tagged with these RFID chips, or, may be selectively programmed from external devices to remember data provided during connections. Equally, the RFIDs may be polled for their data content which may or may not be protected with encryption, permission schemes, levels of access based on passcodes or, based on multibiometric signing and associated levels assigned to a given multibiometric. One interesting use of the larger capacitor as discussed above, is to allow for charging of many such RFIDs in reasonably close proximity to one another. A charging beacon, emitting wireless power within range of the antenna (611) charges the larger capacitor (603) much more quickly than the smaller capacitor (602). This will prove useful when communication to RFID chips is desirable en masse, such as when conducting an inventory, or, checking for tagged item aging, as but two non limiting examples. Eg the RFIDs can keep track of time/date and location data, again, as non limiting examples. Location data can be honed to greater accuracy by allowing the RFIDs to communicate with local WiFi routers, installed with calibrated internal location data which is intended to be ultra accurate, so, local RFIDs can estimate their location data from the WiFi routers and their relative distance between multiple calibrated WiFi routers.

Many modifications and other embodiments of the disclosure will come to mind to one skilled in the art to which this disclosure pertains having the benefit of the teachings presented in the foregoing descriptions and the associated drawings, particularly with respect to the types of circuitry and software used. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An RFID communicator module for a mobile device, for conducting a communication session with at least one external device across a communication distance, comprising a chip having a plurality of pairs of directional antenna-array transmitters and receivers; wherein at least two of said pairs each comprise a transmit/receive channel respectively tuned to two different fixed frequencies selected to exhibit disparate frequency-dependent attenuation over said communication distance; each said pair is in communication with a tunable transmission line distinguishing one of said two different fixed frequencies; said at least one external device comprises an RFID responsive to both of said two different fixed frequencies; a single core modem, power management and processing/memory shares said at least two transmit/receive channels, said processing/memory comprising; a mobile device calculating unit calculating the magnitude of said communication distance from said disparate frequency-dependent attenuation; the mobile device calculating unit determining, from said directional antenna-array transmitters, a communication direction from said mobile device to a communicating external device; a mobile device memory unit storing location data corresponding to said communication direction and the magnitude of said communication distance.

2. The RFID communicator module of claim 1 further comprising first (602) and second (603) capacitors for power storage and use for power and a voltage regulator circuit (604) programmably sharing power between the two capacitors wherein said first capacitor has less the capacitance of said second capacitor.

3. The RFID communicator module of claim 2 wherein further; the second capacitor (603) charges from a second frequency to which the antenna array(s) (611) are tuned by said transmission line; the second frequency is be deliberately selected from ranges least likely to interfere with the primary frequency tuned to antenna (610).

4. The RFID communicator module of claim 3 wherein; the second capacitor (603) is to allow for charging of many such RFIDs in reasonably close proximity to one another; a charging beacon, emitting wireless power within range of the antenna (611) charges the second capacitor (603) much more quickly than the first capacitor (602); at least a second transmission line carrying said primary and said secondary frequencies, each on a side band channel.

5. The RFID communicator module of claim 3 wherein said first capacitor is about ⅒th the capacitance of said second capacitor.

6. The RFID communicator module of claim 3 wherein the two capacitors charge from separate antennas.

7. A method of establishing a spatial relationship between two devices conducting a communication session across a communication distance, a personal mobile device having memory and a communicating external device, respectively comprising at least two transmit/receive directional antenna channels; wherein said spatial relationship comprises at least said communication distance and a direction from said personal mobile device to said communicating external device; said two channels are carried on different RF frequencies sufficiently spaced to exhibit disparate frequency-dependent attenuation over a range of straight-line distances between two feet and one thousand feet, further comprising;

a step of calculating said communication distance from said disparate frequency-dependent attenuation; a step of calculating the direction between said two devices from said at least two transmit/receive antenna channels; a step of storing location data corresponding to said spatial relationship.

8. The method of claim 7 further comprising steps of storing a unique identifier in said memory and making said identifier available to said external device.

9. The method of claim 8 further comprising a step of reprogramming in response to communication from said external device, or pre-programming to allow or deny additional communications from devices and allow or deny access to any and all features.

10. The method of claim 9 wherein said remote device establishes communications on one frequency and channel first, thereafter providing some guidance (homing) to the RFID circuitry due to attenuation field strength and the remote device being optimized to provide a vector, a direction to the RFID circuitry.

11. The method of claim 10 wherein as the remote device seeking further communications and direction to the RFID circuitry and moves closer, a second frequency comes into range providing a new vector in similar fashion and communications.

12. The method of claim 11 wherein frequencies rise higher and higher as the device seeking communications and direction moves closer and closer, other RFIDs in proximity play in less and less based on the simple phenomena of attenuation diminishment over distance which may be further based on frequency.

13. The method of claim 12 further comprising amplifying and maintaining amplification as linear.

14. The method of 8 further comprising steps of selecting communications with only one RFID and ignoring competing RFID beacon fields.

15. The method of claim 14 of the invention further comprising steps of communicating with a first class of RFIDs to send and receive commands allowing turning off RFID communications for a set time with selected RFIDs in range to facilitate homing to a second class of RFIDs in range or a single RFID.

16. The method of claim 8 further comprising a step of honing location data to greater accuracy by allowing the RFIDs to communicate with local WiFi routers.

17. The method of claim 9 further comprising a step of retaining, in said memory, meta data passed from local devices which indicate interest in an item tagged with these RFID chips or may be selectively programmed from external devices to remember data provided during connections or polling RFIDs for their data content.

18. The method of claim 17 wherein said step of step of storing location data further comprises holding location data in memory controlled by authorized surrounding communications devices.

19. The method of claim 7 further comprising at least three single-side band (SSB) transmit/receive channels and an antenna tuned by transmission lines to the frequency of each said channel.

20. The RFID communicator module of claim 2 further comprising a second, redundant RFID chip and wherein the two chips are interconnected by at least two communications pathways which also share power.

* * * * *